Patented Sept. 16, 1952

2,610,967

UNITED STATES PATENT OFFICE 2,610,967

PRODUCTION OF ORGANO-THIYL COMPOUNDS

Morton Kleiman, Chicago, Ill., assignor to Velsicol Corporation, Chicago, Ill., a corporation of Illinois No Drawing. Application December 20, 1946, Serial No. 717,598

13 Claims. (Cl. 260—247.1)

This invention relates to organo-thiyl compounds, such as organic disulfides and mercaptans, and to a process for producing the same. More particularly, my invention relates to new classes of organic disulfides and new compositions of matter, as well as to methods whereby these and related known materials may be prepared.

One object of this invention is to provide a new process for preparing symmetrical and unsymmetrical organic disulfides. A symmetrical disulfide is herein defined as a compound of the general formula RSSR, wherein R represents any organic radical. An unsymmetrical organic disulfide is herein defined as a compound of the general formula RSSR', wherein R and R' represent two different organic radicals.

Another object of this invention is the preparation of organic disulfides hitherto unknown and/or believed to be impossible of existence.

Another object of this invention is to provide a new and simplified process for producing organic disulfides which have heretofore been prepared only with great difficulty by previously known methods.

Another object relates to the production and recovery of mercaptans.

Other objects and advantages will become apparent hereinafter.

Heretofore, only a few unsymmetrical organic disulfides have been synthesized. These have included a number of variously substituted diaryl disulfides and aryl alkyl disulfides. The methods involved in the preparation of these compounds have all been severely limited, painstaking, and costly, and therefore generally unsuited to industrial practice. Furthermore, owing to the extremely limited utility of these methods, it has never before been possible to synthesize most of the vast number of unsymmetrical disulfides theoretically capable of existence. Thus, no successful synthesis of any of the following types of unsymmetrical disulfides has heretofore been recorded:

1. Di-aliphatic and substituted di-aliphatic disulfides, such as, for example, methyl n-amyl disulfide, methyl beta-hydroxyethyl disulfide, or ethyl beta-chloroethyl disulfide.

2. Aliphatic alicyclic and substituted aliphatic alicyclic disulfides, such as, for example, ethyl cyclohexyl disulfide or ethyl 4-chlorocyclohexyl disulfide.

3. Substituted aliphatic aromatic disulfides, such as, for example, beta-hydroxyethyl phenyl disulfide, methyl 4-chlorophenyl disulfide, or isopropyl 3-nitrophenyl disulfide.

4. Aliphatic heterocyclic and substituted aliphatic heterocyclic disulfides, such as, for example, methyl 2-benzothiazyl disulfide, ethyl 2-thienyl disulfide, or methyl 2-pyridyl disulfide.

5. Di-alicyclic and substituted di-alicyclic disulfides, such as, for example, cyclopropyl cyclohexyl disulfide, or 4-bromocyclohexyl disulfide.

6. Alicyclic aromatic and substituted alicyclic aromatic disulfides, such as, for example, cyclohexyl naphthyl disulfide, cyclopentyl phenyl disulfide, or cyclopentyl 2-chlorophenyl disulfide.

7. Alicyclic heterocyclic and substituted alicyclic heterocyclic disulfides, such as, for example, cyclohexyl 4-pyridyl disulfide or cyclopentyl 2-benzothiazyl disulfide.

8. Aromatic heterocyclic and substituted aromatic heterocyclic disulfides, such as, for example, phenyl 2-thienyl disulfide or 4-nitrophenyl 2-pyrryl disulfide.

9. Di-heterocyclic and substituted di-heterocyclic disulfides, such as, for example, 4-pyridyl 2-benzothiazyl disulfide or 4-(2-chloropyridyl) 2-benzothiazyl disulfide.

Compounds belonging to any of the above classes may now be prepared simply, and in good yield by the process embodied in the present invention.

Broadly stated, my invention comprises providing an appropriate reaction mixture in which all the groups desired are present (but obviously not in the same combination as that of the finally desired compound or compounds) and effecting the redistribution of these groups by appropriate means, as described hereinafter.

Thus, in one specific embodiment, my invention relates to a method of synthesizing organic disulfides by effecting a redistribution of organo-thiyl groups, as described hereinafter, within a reaction mixture of organic disulfides wherein the organo-thiyl groups of the reactants are in combination different from that of the desired reaction product. The reaction mixture may be composed of different symmetrical organic disulfides, different unsymmetrical organic disulfides, or a mixture of symmetrical and unsymmetrical organic disulfides. For example, an unsymmetrical organic disulfide may be synthesized by subjecting to appropriate redistribution conditions a reaction mixture comprising two symmetrical organic disulfides.

In another specfic embodiment, my invention relates to a method of synthesizing organic disulfides, either symmetrical or unsymmetrical, by effecting a redistribution of the organo-thiyl groups, as described hereinafter, within a reaction mixture of an organic disulfide and a mercaptan wherein the organo-thiyl groups of the reactants are in combination different from that of the desired reaction product. The organic disulfide of the reaction mixture may be unsymmetrical or symmetrical. In the latter case the RS-group of the mercaptan should be different from those present in the symmetrical organic disulfide. In this embodiment mercaptans may be recovered as a product or by-product of the process.

In still another specific embodiment, my invention relates to the synthesis of symmetrical organic disulfides by effecting, as described hereinafter, a redistribution of the organo-thiyl groups of unsymmetrical organic disulfides.

The following are illustrative of some of the reactions which occur:

1. $RSSR + R'SSR' \rightleftharpoons 2RSSR'$
2. $RSSR + R'SH \rightleftharpoons RSSR' + RSH$
3. $RSSR + 2R'SH \rightleftharpoons R'SSR' + 2RSH$ Thus, in accordance with Equation 1, any particular unsymmetrical disulfide, RSSR', may be obtained by appropriate treatment as described hereinafter, of a mixture of the two symmetrical disulfides, RSSR, and R'SSR'. Conversely, unsymmetrical disulfides may be similarly converted and by subsequent suitable fractionation or other ordinary purification procedure separated into each of the symmetrical disulfides corresponding to the various RS-groups originally present.

In accordance with Equation 2, any particular unsymmetrical disulfide, RSSR', may be obtained by analogous treatment of an approximately equimolar mixture of a symmetrical disulfide, RSSR, and a mercaptan, R'SH.

In accordance with Equation 3, a symmetrical disulfide, R'SSR', may be obtained by reacting two or more mols of its corresponding thiol compound, R'SH, with approximately one mol of a different, symmetrical disulfide, RSSR. It is obvious that this same reaction may be utilized as well for producing mercaptans. A special case of this reaction is the catalyzed reduction of a disulfide by hydrogen sulfide; this reagent may be regarded as a mercaptan, reacting in accordance with the same general scheme, as follows:

4. 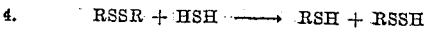RSSR + HSH ⟶ RSH + RSSH

RSH + S

The end result being:

5. $RSSR + H_2S \rightarrow 2RSH + S$

For carrying out the redistribution reactions described above in accordance with the present invention, the reactants are heated together at high temperatures, as explained in greater detail hereinafter.

The processes embodied in the present invention involve heating a reaction mixture containing the necessary components at temperatures of from about 150° C. to about 225° C. for a period of from about one to about four hours. In some instances, it may also be necessary to provide sufficient pressure to confine the reactants to the reaction vessel or other reaction zone. At these high temperatures, the molecules of the reactants acquire sufficient energy to form some organothiyl free radicals; the latter effect the redistribution by the following type of chain reaction:

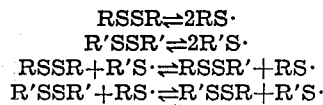

$RSSR \rightleftharpoons 2RS\cdot$
$R'SSR' \rightleftharpoons 2R'S\cdot$
$RSSR + R'S\cdot \rightleftharpoons RSSR' + RS\cdot$
$R'SSR' + RS\cdot \rightleftharpoons R'SSR + R'S\cdot$
etc.

These limits of time and temperature are not severely critical, but represent, rather, the optimum working range. The lower temperature represents approximately the lowest degree of heat which is still sufficient for the initiation of the free radical chain reaction of the type indicated, although temperatures as low as 125° C. may serve the purpose in special cases. At temperatures much above the upper limit, some decomposition of the reactants is liable to occur, and the contamination of the product which may result is usually undesirable, although the reaction may be carried out at temperatures as high as 250° C.— or even 300° C.— when the attendant decomposition is not regarded as particularly undesirable. The duration of the reaction period is, of course, dependent upon the temperature; it is obvious that a higher temperature will require a shorter reaction period, and vice versa. It should be noted also that it is not necessary that the time allowed for reaction be a full hour; even shorter reaction periods are feasible, although generally the yield of product will be lower in such instance. Furthermore, the reaction period need not be limited to four hours; it may equally well extend to twenty-four hours, or even longer. After the redistribution has been effected, the reaction product is separated by usual methods, such as fractional distillation, crystallization, etc.

There are many important uses in industry and the arts for organic disulfides and mercaptans prepared in accordance with my invention, including both those previously known but which may now be prepared more simply and cheaply by the processes of my invention, and those which have not previously been known and which may now be prepared for the first time by the methods herein disclosed. Especially prominent among the many industrial applications of these known compounds is their utilization as modifiers, stabilizers, accelerators, anti-oxidants and vulcanizing agents in the manufacture of synthetic and natural rubber products. Among the large number of such compounds which are useful for these applications, the following may be mentioned as typical: Alpha- and beta- naphthyl mercaptans, o- and p- mercaptobiphenyls, diisopropyl dixanthogen, tolyl disulfide, alkyl phenol disulfides, 2-methylbutyl disulfide, 3-methylpentyl disulfide, 2-ethylhexyl disulfide, 2-mercaptobenzothiazole, 2-mercaptobenzoxazole, 2-mercapto-4-alkyl or aryl-thiazole, thioglycolic acid, thiolactic acid, beta-mercaptoethanol, dithiodiglycolic acid, bis-(beta-hydroxyethyl) disulfide, and bis-(beta-aminoethyl) disulfide.

Organic disulfides such as butyl disulfide, whose preparation from butyl mercaptan is described in Example 1, are excellent solvents for rubber, resins and plastics, and their use enables the utilization of a wide variety of special formulations of coating compositions which exploit the unique plasticizing properties of these materials—especially of rubber.

Many mercaptans and disulfides, previously known, but which may now be prepared more simply and economically by the processes of my invention, are chemical intermediates for the synthesis of sulfonic acids and sulfonium compounds which find extensive applications as wetting agents, detergents, emulsifiers and demulsifiers. Certain mercaptans, such as ethyl mercaptan, butyl mercaptan, and amyl mercaptan, and disulfides, such as furfuryl disulfide, are of considerable importance as odorants, the former as warning agents in gases and the latter as ingredients in perfumes. In the manufacture of particular types of glues and adhesives, certain vegetable proteins and albumenoids, such as soybean flour, linseed protein, etc., are treated with organic disulfides, such as methyl disulfide and butyl disulfide. Allyl disulfide and 2-methylallyl disulfide are valuable additives for imparting greater stability to films against the action of heat and ultraviolet light. The xanthates and dixanthogens are well known and have long been used as flotation agents. Other disulfides, such as dihexamethylenethiuram disulfide, dimorpholinethiuram disulfide, diphenyl disulfide, bis-(4-chlorophenyl) disulfide and beta-naphthyl disulfide, are of use as fungicides and insecticides. A number of disulfides, such as methyl disulfide and ethyl disulfide, are also used as additives in lubricating oils for improving the film strength and tenacity under high pressure, and as stabilizing agents in viscous, highly refined mineral oils, such as transformer oils.

In the category of organic disulfides which have hitherto been unknown and impossible to prepare by known methods but which may now be made according to the principles herein disclosed, are many compounds which I have found to possess properties valuable in industry and the arts. These compounds are useful in many of the applications enumerated above; in addition, particular compounds possess uniquely valuable characteristics.

Thus, for example, the new compound, methyl n-butyl disulfide, described in Example 2, combines the advantages of both the methylthiyl and the butylthiyl groups in one molecule, and will thus be found of greater value than either of the parent compounds in the manufacture of glue and adhesives. Methyl octyl disulfide, described in Example 3, will be found useful as an odorant, fixative, and co-solvent in perfumes. It is also an excellent solvent for rubber, resins and plastics, and therefore of value in special coating composition formulations. Methyl beta-hydroxyethyl disulfide and ethyl 2-benzothiazyl disulfide, described in Examples 4 and 5, respectively, will be found useful as rubber chemicals of the type previously described.

From the foregoing discussion and examples it is evident that my invention provides not only simple and inexpensive processes for preparing a large number of known mercaptans and disulfides but also makes possible the synthesis of hitherto unknown disulfides, the composition of which can be "tailored" to provide unique and specially desired characteristics.

Typical practice of this invention, its simplicity, and wide utility will be illustrated by the following specific examples, which are not intended to limit the invention in any respect:

Example 1

Reaction of a symmetrical organic disulfide with an excess of a mercaptan at high temperature to form a different disulfide and mercaptan: Methyl disulfide and n-butyl mercaptan were reacted to give n-butyl disulfide and methyl mercaptan as follows: Methyl disulfide (4.7 ml., 0.05 mol) and n-butyl mercaptan (21 ml., 0.2 mol) were placed in a high-pressure chamber and heated at 220° C. for 1 hour. At the end of this time, the reaction mixture was cooled to 0°, and the methyl mercaptan which was now present was collected as the mixture gradually warmed up to room temperature. n-Butyl disulfide and some methyl n-butyl disulfide were then obtained after removal of the excess n-butyl mercaptan.

Example 2

Reaction of two symmetrical organic disulfides at high temperature to produce a new, unsymmetrical disulfide: Methyl disulfide and n-butyl disulfide were reacted to form methyl n-butyl disulfide, as follows: Methyl disulfide (10 ml.) and n-butyl disulfide (10 ml.) were heated in a bomb tube at 200° C. for three and one-half hours. The resulting mixture, upon fractional distillation under reduced pressure, gave methyl n-butyl disulfide, $b_{22}$ 77.50–78.5° C., weighing 10.2 gm.

Example 3

Reaction of two symmetrical organic disulfides at high temperature to produce a new, unsymmetrical disulfide: n-Octyl disulfide and methyl disulfide were reacted to give methyl n-octyl disulfide, as follows: Methyl disulfide (13.5 ml., 0.15 mol) and n-octyl disulfide (16.1 ml., 0.05 mol) were placed in a sturdy reaction chamber and heated at 190° C. for two hours. The mixture was cooled and fractionally distilled at reduced pressure. After removal of the excess methyl disulfide in the forerun, clear, water-white methyl n-octyl disulfide, $b_{0.3}$ 65–68° C., was obtained.

Example 4

Reaction of two symmetrical organic disulfides at high temperature to produce a new, unsymmetrical disulfide: Methyl disulfide and bis-(beta-hydroxyethyl) disulfide were reacted to give methyl beta-hydroxyethyl disulfide, as follows: Methyl disulfide (28.2 g., 0.3 mol) and bis-(beta-hydroxyethyl) disulfide (23.1 g., 0.15 mol) were sealed in a sturdy bomb and heated at 185° C. for three hours. The reaction mixture, after cooling, was washed with water (to remove and recover unreacted bis-(beta-hydroxyethyl) disulfide), and the organic layer remaining was dried over anhydrous potassium carbonate. The excess methyl disulfide was removed by fractional distillation under reduced pressure, and the crude product remaining was then fractionated at 20 mm. of mercury pressure, giving methyl-beta-hydroxyethyl disulfide, $b_{20}$ 112.5–113.5° C.

Example 5

Reaction of two symmetrical organic disulfides at high temperature to produce a new, unsymmetrical disulfide: Ethyl disulfide and 2-benzothiazyl disulfide were reacted to give ethyl benzothiazyl disulfide, as follows: Ethyl disulfide (36.6 g., 0.3 mol) and 2-benzothiazyl disulfide (6.7 g., 0.02 mol) were heated together in a sturdy reaction vessel at 190° C. for two hours. The reaction mixture was now cooled, and the excess ethyl disulfide distilled off at 20 mm. pressure. Distillation of the crude product gave ethyl 2-benzothiazyl disulfide, $b_{0.005}$ 115–117° C.

Example 6

Reaction of two symmetrical organic disulfides at high temperature to produce a new, unsymmetrical disulfide: Methyl disulfide and diisopropyl dixanthogen were reacted to give methyl isopropoxythioformyl disulfide, as follows: Methyl disulfide (200 g.) and diisopropyl dixanthogen (40 g.) were placed in a steel bomb and heated at 175° C. for four hours. Fractional distillation of the mixture at reduced pressure gave recovered methyl disulfide and methyl isopropoxythioformyl disulfide, $b_{0.25}$ 50–52° C.

*Example 7*

Reaction of two symmetrical organic disulfides at high temperature to produce a new, unsymmetrical disulfide: Methyl disulfide and tetramethylthiuram disulfide were reacted to give methyl N,N-dimethylaminothioformyl disulfide, as follows: The two reactants were heated at 200° C. in a steel reaction chamber for three hours. The product, methyl N,N-dimethylaminothioformyl disulfide, $b_{0.7}$ 104–108° C., was obtained upon fractional distillation of the reaction mixture at reduced pressure.

*Example 8*

Reaction of an unsymmetrical organic disulfide at high temperature to form two symmetrical disulfides: Ethyl phenyl disulfide was converted into ethyl disulfide and phenyl disulfide, as follows: Ethyl phenyl disulfide (25.0 g.) was heated in a sealed bomb tube for three hours at 190° C. Fractionation of the reaction mixture under reduced pressure, and crystallization of the solid residue gave ethyl disulfide, ethyl phenyl disulfide, and phenyl disulfide in a molar ratio of approximately 1:2:1.

*Example 9*

Reaction of an unsymmetrical organic disulfide at high temperature to form two symmetrical disulfides: n-Propyl alpha-naphthyl disulfide was converted into n-propyl disulfide and bis-(alpha-naphthyl) disulfide as follows: n-Propyl alpha-naphthyl disulfide was heated at 190° C. for three hours in a sturdy reaction vessel. Fractionation of the reaction mixture under reduced pressure, and crystallization of the solid residue now gave n-propyl disulfide, n-propyl alpha-naphthyl disulfide and bis-(alpha-naphthyl) disulfide in a molar ration of approximately 1:2:1.

Other examples of various reactants, processes, and reaction products, are as follows:

10. Ethyl n-butyl disulfide, an unsymmetrical, dialiphatic disulfide, may be prepared from n-butyl mercaptan and ethyl disulfide in a 1:1 molar ratio, by heating these materials at 200° C. in the manner already described. Ethyl mercaptan is recovered as a by-product of this reaction.

11. Ethyl 2-chloroethyl disulfide, an unsymmetrical, substituted, di-aliphatic disulfide, may be prepared from a mixture of the two symmetrical disulfides, ethyl disulfide, and bis-(2-chloroethyl) disulfide, by heating these materials at 190° C. as outlined above.

12. Ethyl allyl disulfide, an unsymmetrical, di-aliphatic disulfide may be prepared similarly at 185–190° C. by reacting ethyl disulfide and allyl mercaptan in a 1:1 molar ratio. Ethyl mercaptan is recovered as a by-product of this reaction.

13. Isopropyl cyclopentyl disulfide, an unsymmetrical, aliphatic alicyclic disulfide, may be prepared at 200° C. from a mixture of the two symmetrical compounds, isopropyl disulfide and cyclopentyl disulfide, as outlined above.

14. Ethyl cyclohexyl disulfide, an unsymmetrical, aliphatic alicyclic disulfide, may be prepared at 200° C. from ethyl disulfide and cyclohexyl mercaptan in a 1:1 molar ratio, in the manner already described. Ethyl mercaptan is recovered as a by-product of this reaction.

15. Allyl 4-chlorocyclohexyl disulfide, an unsymmetrical, substituted, aliphatic alicyclic disulfide, may be prepared at 185–190° C. from a mixture of the two symmetrical compounds, allyl disulfide and 4-chlorocyclohexyl disulfide, in the manner described above.

16. 2-hydroxyethyl phenyl disulfide, a substituted, unsymmetrical, aliphatic aromatic disulfide, may be prepared at 185° C. from a mixture of the two symmetrical disulfides, bis-(2-hydroxyethyl) disulfide, and phenyl disulfide, in the manner already described.

17. 2-chloropropyl alpha-naphthyl disulfide, a substituted, unsymmetrical, aliphatic aromatic disulfide, may be prepared at 190° C. from a mixture of the two symmetrical disulfides, bis-(2-chloropropyl) disulfide and bis-(alpha-naphthyl) disulfide.

18. Methyl 4-chlorophenyl disulfide, an unsymmetrical, substituted, aliphatic aromatic disulfide, may be prepared from a mixture of methyl disulfide and 4-chlorothiophenol in a 1:1 molar ratio, in the manner already described in greater detail above, by heating these reactants at a temperature of 200° C. Methyl mercaptan is recovered as a by-product of this reaction.

19. Ethyl 2-thienyl disulfide, an unsymmetrical, aliphatic heterocyclic disulfide, may be prepared at 195° C. from ethyl disulfide and 2-mercaptothiophene in a 1:1 molar ratio. Ethyl mercaptan is recovered as a by-product of this reaction.

20. Methyl 2-pyridyl disulfide, an unsymmetrical, aliphatic heterocyclic disulfide, may be prepared at 185–190° C. from methyl disulfide and 2-mercaptopyridine by reacting these two materials in a 1:1 molar ratio. Methyl mercaptan is recovered as a by-product of this reaction.

21. Allyl 4-(2-chloropyridyl) disulfide, an unsymmetrical, substituted, aliphatic heterocyclic disulfide, may be prepared in the same manner from a mixture of the two symmetrical disulfides, allyl disulfide, and bis-[4-(2-chloropyridyl)] disulfide, by heating these two reactants at 180–190° C.

22. Cyclopentyl cyclohexyl disulfide, an unsymmetrical, di-alicyclic disulfide, may be prepared in the manner already described from a mixture of the two symmetrical compounds, cyclopentyl disulfide and cyclohexyl disulfide, by reacting these materials at 220° C.

23. 3-chlorocyclohexyl cyclohexyl disulfide, a substituted, unsymmetrical di-alicyclic disulfide, may be prepared from a mixture of the two symmetrical compounds bis-(3-chlorocyclohexyl) disulfide and cyclohexyl disulfide by interacting the two in the usual manner at 190° C.

24. Cyclopentyl cyclohexyl disulfide, an unsymmetrical, di-alicyclic disulfide may be prepared from cyclopentyl disulfide and cyclohexyl mercaptan in a 1:1 molar ratio by interacting the two at 185–200° C. as described above. Cyclopentyl mercaptan is recovered as a by-product in this reaction.

25. Cyclohexyl phenyl disulfide, an unsymmetrical, alicyclic aromatic disulfide, may be prepared in the usual manner from a mixture of the two symmetrical compounds, cyclohexyl disulfide and phenyl disulfide, by interacting these materials at 225° C.

26. Cyclohexyl beta-naphthyl disulfide, an unsymmetrical, alicyclic aromatic disulfide, may be prepared by interacting the two symmetrical compounds, cyclohexyl disulfide and beta-naphthyl disulfide at 210° C.

27. Cyclopentyl 2-chlorophenyl disulfide, an unsymmetrical, substituted, alicyclic aromatic disulfide, may be prepared by interacting cyclopentyl disulfide and 2-chlorothiophenol in a 1:1 molar ratio at 220° C. Cyclopentyl mercaptan is recovered as a by-product of this reaction.

28. Cyclohexyl 4-pyridyl disulfide, an unsymmetrical, alicyclic heterocyclic disulfide, may be prepared in the usual manner from a mixture of the two symmetrical disulfides, cyclohexyl disulfide and bis-(4-pyridyl) disulfide by interacting these materials at 185–190° C.

29. Cyclopentyl 2-benzothiazyl disulfide, an unsymmetrical, alicyclic heterocyclic disulfide, may be prepared from an equimolar mixture of cyclopentyl disulfide and 2-mercaptobenzothiazol by heating these materials at 185–190° C. Cyclopentyl mercaptan may be recovered as a by-product of this reaction.

30. 4-chlorocyclohexyl 2-thienyl disulfide, a substituted, unsymmetrical, alicyclic heterocyclic disulfide, may be prepared from a mixture of the two symmetrical compounds, bis-(4-chlorocyclohexyl) disulfide and bis-(2-thienyl) disulfide by interacting these materials at 190° C.

31. Phenyl 2-thienyl disulfide, an unsymmetrical, aromatic heterocyclic disulfide, may be prepared by interacting in a 1:1 molar ratio, bis-(2-thienyl) disulfide and thiophenol at 200° C. 2-mercaptothiophene is recovered as a by-product of this reaction.

32. Phenyl 4-pyridyl disulfide, an unsymmetrical, aromatic heterocyclic disulfide, may be prepared from a mixture of the two symmetrical compounds, phenyl disulfide and bis-(4-pyridyl) disulfide, by interacting these two materials in the usual manner at 190° C.

33. 4-nitrophenyl 2-thienyl disulfide, a substituted, unsymmetrical, aromatic heterocyclic disulfide, may be prepared by interacting the two symmetrical compounds, bis-(4-nitrophenyl) disulfide and bis-(2-thienyl) disulfide in the usual manner at 200° C.

34. 2-thienyl 4-pyridyl disulfide, an unsymmetrical, di-heterocyclic disulfide, may be prepared from a 1:1 molar mixture of bis-(2-thienyl) disulfide and 4-mercaptopyridine by interacting these two materials at 190° C. 2-mercaptothiophene is recovered as a by-product of this reaction.

35. 4-pyridyl 4-(2-chloropyridyl) disulfide, a substituted, unsymmetrical, di-heterocyclic disulfide, may be prepared by reacting a mixture of the two symmetrical compounds, bis-(4-pyridyl) disulfide and bis-[4-(2-chloropyridyl)] disulfide at 185–200° C.

36. 2-thienyl 2-benzothiazyl disulfide, an unsymmetrical, di-heterocyclic disulfide, may be prepared from a mixture of the two symmetrical materials, bis-(2-thienyl) disulfide and bis-(2-benzothiazyl) disulfide by interacting these two materials in the usual manner at 195° C.

Other examples of the preparation of symmetrical disulfides by interaction of two mols of a mercaptan with one mol of a symmetrical disulfide are as follows:

37. Phenyl disulfide, a symmetrical, aromatic disulfide, may be prepared by reacting a mixture of two or more mols of thiophenol and one mol of isopropyl disulfide at 225° C. Isopropyl mercaptan is recovered as a by-product of this reaction.

38. Beta-naphthyl disulfide, a symmetrical, aromatic disulfide, is prepared from beta-mercaptonaphthalene when two or more mols of this compound are interacted with one mol of ethyl disulfide at 200° C. Ethyl mercaptan is recovered as a by-product in this reaction.

39. Bis-(4-pyridyl) disulfide, a symmetrical, di-heterocyclic disulfide, may be prepared by interacting two or more mols of 4-mercaptopyridine with one mol of methyl disulfide at a temperature of 190° C. Methyl mercaptan is recovered as a by-product in this reaction.

Other examples of the formation of symmetrical disulfides by redistribution of an unsymmetrical organic disulfide at high temperatures are as follows:

40. The unsymmetrical, substituted, aliphatic aromatic disulfide, 2-hydroxyethyl phenyl disulfide, gives the symmetrical compounds bis-(2-hydroxyethyl) disulfide, and phenyl disulfide, when it is heated at 185° C. as already described.

41. The unsymmetrical, di-aliphatic disulfide, ethyl allyl disulfide, gives the two symmetrical compounds, ethyl disulfide and allyl disulfide, by heating it in the usual manner at 195° C.

42. The unsymmetrical, aliphatic alicyclic disulfide, isopropyl cyclopentyl disulfide, likewise gives the two symmetrical compounds, isopropyl disulfide and cyclopentyl disulfide, by heating it in the usual manner at 185–190° C.

Any of the numerous, unsymmetrical disulfides mentioned above will react in a similar manner under similar reaction conditions to furnish an equilibrium mixture of the two symmetrical disulfides which correspond to the organo-thiyl groups of the unsymmetrical disulfide.

The above description and examples are for illustration only and are not intended to limit the scope of the invention. Any departure therefrom which conforms to the spirit of the invention and comes within the scope of the appended claims is to be regarded as an embodiment of this invention.

I claim as my invention:

1. The method of synthesizing organic disulfides which comprises subjecting reactants containing different organo-thiyl groups selected from the group consisting of (a) a mixture of organic disulfides, (b) a mixture of an organic disulfide and a mercaptan, and (c) an unsymmetrical organic disulfide—the organo-thiyl groups of said reactants being in combination different from that of the reaction products—to a redistribution of their organo-thiyl groups by thermally reacting said reactants at a temperature of from 125° C. to 300° C.

2. The method of synthesizing organic disulfides which comprises subjecting reactants containing different organo-thiyl groups selected from the group consisting of (a) a mixture of organic disulfides, (b) a mixture of an organic disulfide and a mercaptan, and (c) an unsymmetrical organic disulfide—the organo-thiyl groups of said reactants being in combination different from that of the reaction products—to a redistribution of their organo-thiyl groups by thermally reacting said reactants at a temperature of from about 150° C. to about 225° C.

3. The method of synthesizing an unsymmetrical organic disulfide which comprises effecting the redistribution of the organo-thiyl groups within a mixture of organic disulfides—the organo-thiyl groups of said reactants being in combination different from that of the reaction products—by thermally reacting said mixture at a temperature of from about 150° C. to about 225° C.

4. The method of synthesizing an unsymmetrical organic disulfide, RSSR', which comprises effecting the redistribution of the organo-thiyl groups within a mixture of two symmetrical organic disulfides, RSSR, and R'SSR', wherein R and R' represent two different organic radicals, by thermally reacting said mixture at a temperature of from about 150° C. to about 225° C.

5. The method of synthesizing an unsymmetrical organic disulfide which comprises subjecting a mixture of an organic disulfide and a mercaptan—the organo-thiyl groups of said reactants being in combination different from that of the reaction products—to a redistribution of their organo-thiyl groups by thermally reacting said mixture at a temperature of from about 150° C. to about 225° C., and recovering the unsymmetrical organic disulfide and the mercaptan formed in the process.

6. The method of synthesizing an unsymmetrical organic disulfide which comprises subjecting a mixture of approximately molar equivalent quantities of a symmetrical organic disulfide, RSSR, and a mercaptan, R'SH, wherein R and R' represent two different organic radicals, to a redistribution of their organo-thiyl groups by thermally reacting said mixture at a temperature of from about 150° C. to about 225° C., and recovering the unsymmetrical organic disulfide and the mercaptan formed in the process.

7. The method of synthesizing a symmetrical organic disulfide which comprises subjecting a mixture of approximately one mol of an organic disulfide and at least two mols of a mercaptan—the organo-thiyl groups of said reactants being in combination different from that of the reaction products—to a redistribution of their organo-thiyl groups by thermally reacting said mixture at a temperature of from about 150° C. to about 225° C., and recovering the symmetrical organic disulfide and the mercaptan formed in the process.

8. The method of synthesizing a symmetrical organic disulfide, R'SSR', which comprises subjecting a mixture of approximately one mol of a symmetrical organic disulfide, RSSR, and at least two mols of a mercaptan, R'SH, wherein R and R' represent two different organic radicals, to a redistribution of their organo-thiyl groups by thermally reacting said mixture at a temperature of from about 150° C. to about 225° C., and recovering the symmetrical organic disulfide and the mercaptan formed in the process.

9. The method of synthesizing the symmetrical organic disulfides, RSSR, and R'SSR', which comprises subjecting an unsymmetrical organic disulfide, RSSR', wherein R and R' represent two different organic radicals, to a redistribution of its organo-thiyl groups by thermally reacting said unsymmetrical organic disulfide at a temperature of from about 150° C. to about 225° C.

10. The method of synthesizing an unsymmetrical organic disulfide, RSSR', which comprises effecting the redistribution of the organo-thiyl groups within a mixture of two symmetrical organic disulfides, RSSR, and R'SSR', wherein R and R' represent two different organo radicals, by thermally reacting said mixture at a temperature of from about 150° C. to about 200° C.

11. The method of synthesizing an unsymmetrical organic disulfide which comprises subjecting a mixture of an organic disulfide and a mercaptan—the organo-thiyl groups of said reactants being in combination different from that of the reaction products—to a redistribution of their organo-thiyl groups by thermally reacting said mixture at a temperature of from about 150° C. to about 200° C., and recovering the unsymmetrical organic disulfide and the mercaptan formed in the process.

12. The method of synthesizing the symmetrical organic disulfides, RSSR, and R'SSR', which comprises subjecting an unsymmetrical organic disulfide, RSSR', wherein R and R' represent two different organic radicals, to a redistribution of its organo-thiyl groups by thermally reacting said unsymmetrical organic disulfide at a temperature of from about 150° C. to about 200° C.

13. The method of synthesizing organic disulfides which comprises subjecting reactants containing different organo-thiyl groups selected from the group consisting of (a) a mixture of organic disulfides, (b) a mixture of an organic disulfide and a mercaptan, and (c) an unsymmetrical organic disulfide—the organo-thiyl groups of said reactants being in combination different from that of the reaction products—to a redistribution of their organo-thiyl groups by thermally reacting said reactants at a temperature of from about 150° C. to about 200° C.

MORTON KLEIMAN.

REFERENCES CITED

The following references are of record in the file of this patent:

UNITED STATES PATENTS

| Number | Name | Date |
|---|---|---|
| 2,174,248 | Mikeska | Sept. 26, 1939 |
| 2,230,542 | Meinert | Feb. 4, 1941 |
| 2,237,627 | Olin | Apr. 8, 1941 |
| 2,259,861 | Richardson | Oct. 21, 1941 |

OTHER REFERENCES

Bersin et al., Berichte, vol. 71, 1015-24 (1938).